(12) United States Patent
Dentzer et al.

(10) Patent No.: US 8,027,963 B2
(45) Date of Patent: Sep. 27, 2011

(54) DUAL GRANULARITY LOCKING MECHANISM

(75) Inventors: Ralf Dentzer, Hockenheim (DE); Detlef Pluemper, Reichartshausen (DE); Udo Klein, Maximiliansau (DE); Thomas Moser, Wiesloch (DE)

(73) Assignee: SAP AG, Walldorf (DE)

( * ) Notice: Subject to any disclaimer, the term of this patent is extended or adjusted under 35 U.S.C. 154(b) by 1378 days.

(21) Appl. No.: 11/322,573

(22) Filed: Dec. 30, 2005

(65) Prior Publication Data

US 2007/0157157 A1 Jul. 5, 2007

(51) Int. Cl.
*G06F 17/00* (2006.01)

(52) U.S. Cl. ........ 707/704; 707/792; 707/617; 707/624; 707/650; 707/686

(58) Field of Classification Search .................. 707/704, 707/617, 624, 650, 686, 792
See application file for complete search history.

(56) References Cited

U.S. PATENT DOCUMENTS

| | | | | |
|---|---|---|---|---|
| 6,523,027 B1* | 2/2003 | Underwood | ......................... | 1/1 |
| 6,601,233 B1* | 7/2003 | Underwood | ................. | 717/102 |
| 6,633,878 B1* | 10/2003 | Underwood | ......................... | 1/1 |
| 6,704,873 B1* | 3/2004 | Underwood | .................... | 726/12 |
| 7,100,195 B1* | 8/2006 | Underwood | ..................... | 726/2 |

* cited by examiner

*Primary Examiner* — Sana Al Hashemi
(74) *Attorney, Agent, or Firm* — Schwegman, Lundberg & Woessner, P.A.

(57) ABSTRACT

A coarse evaluation lock on data is provided to ensure only one evaluation is run on selected data until completed. A fine exclusive lock on selected data is provided to ensure only one user may change such selected data. The locks may be selectively used during evaluations and while users are changing data.

20 Claims, 7 Drawing Sheets

DUAL GRANULARITY LOCKING MECHANISM

BACKGROUND

Business management systems have many different functions that operate off of data stored in a database. Changes in employee related data may make prior evaluations of the data, or derived data incorrect. Such prior derived data for example, may be payroll data. A retroactive change in pay rate, or a change in previously entered hours worked may cause a previously run payroll process to be incorrect. Once such a change is encountered, the payroll process must be re-run, and appropriate changes to compensation should be performed, such as providing back pay and recalculating appropriate withholding for tax purposes. There are many other examples of retroactive changes resulting in new evaluations being performed. Payroll is just one example of a periodic process that is run and could have prior results invalidated by such a retroactive change to the underlying data. Other examples include marketing and sales evaluations, tax evaluations, and many others.

Currently, new evaluations may be initiated when a user or operator becomes aware of retroactive changes. Potential access problems may occur in transactional multi-user environments. The consistency of data may be problematic. If a change occurs in the data during an evaluation time span, there may be inconsistencies between data read at different times during the evaluation. This can result in a failure. Uncommitted data may be read, leading to incorrect evaluation results should the data not be finally committed.

Locking of data during a process is provided at a coarse level to prevent another process from changing the data. However, such locking can result in slowing down a larger system where other components may need access to the locked data. Such coarse locks tie up larger amounts of data than needed by the current component performing evaluations, resulting in other processes not being able to perform work on locked data that may not be needed by the current process.

Evaluation results should be correct with respect to existing data. Otherwise, wrong results may be obtained. The system may be unreliable, and customers may be dissatisfied.

SUMMARY

A coarse evaluation lock on data is provided to ensure only one evaluation is run on selected data until completed. A fine exclusive lock on selected data is provided to ensure only one user may change such selected data. The locks may be selectively used during evaluations and while users are changing data.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A change pointer is used to identify data that has changed in a transactional component based environment. It includes an effective date for the change. The change pointer may be used by a component running an evaluation or process, such as a payroll component running a payroll process, to identify that data may have changed with an effective date that is earlier than at least one previous execution of the process. The change pointer may also be used for other components other than payroll components. The component process than recalculates data from previous payroll evaluations, going back to the earliest effective date encountered. Thus, a March pay rate change that is retroactive to January, results in the payroll component recalculating evaluations backpay and taxes from January to the present date.

One or more locks may be used to prevent data from being changed while an evaluation is being performed. A coarse granularity lock is used to prevent more than one conflicting evaluation from concurrently executing. A fine lock is used on an employee record while it is being evaluated to prevent selected evaluations from using the data at the same time. The locks may be used in combination with the use of the change pointer to prevent change of data during the process, and may also be used in other contexts. In a further embodiment, a coarse lock is used on the data, and no lock is required for the evaluation. In yet further embodiments, snapshots of data are used in conjunction with a security period to allow use of the snapshot of the data to avoid ambiguous data during an evaluation.

Figure 1:
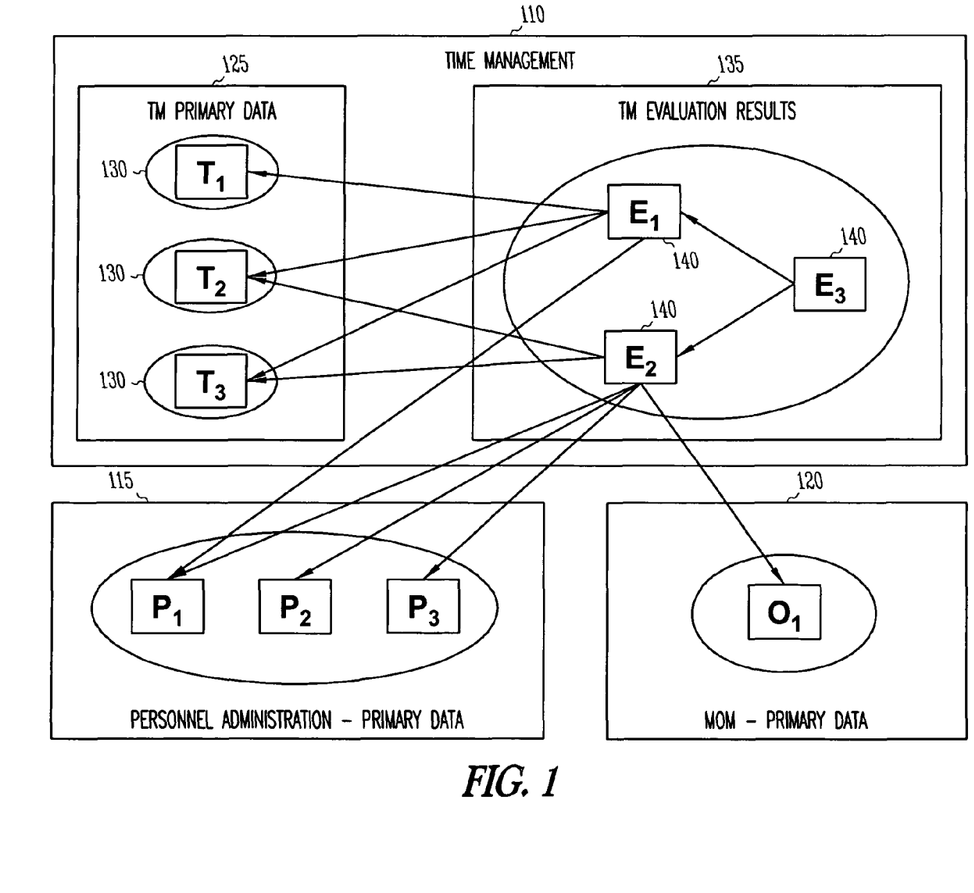
FIG. 1 is a block diagram of time management component interactions with other components according to an example embodiment.

FIG. 1 is a block diagram of a time management component 110 interacting with other components wherein the present method and system are employed. In one embodiment, the components include a personnel administration primary data set 115, and a master organization management (MOM) primary data set 120. Data from other components may also be included. The time management component 110 may include a primary data set 125, having users accessing data represented at 130 and including $T_1$, $T_2$ and $T_3$. Each may be updating a particular employee record with information, such as salary or time entries. A time management evaluation results block 135 indicates several different evaluation processes at 140, including for example $E_1$, $E_2$, and $E_3$. Different users in different roles access different aspects of time data (employees, managers, administrators) and should not lock each other out.

Figure 2:
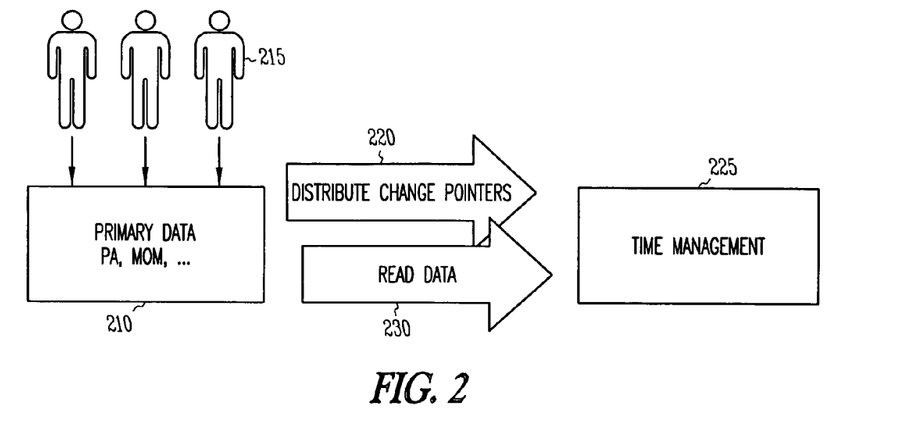
FIG. 2 is a block flow diagram illustrating distribution of change pointers according to an example embodiment.

FIG. 2 is a block diagram representing the formation of change pointers in response to changes in the primary data. Primary data is represented in block 210, and may be changed by users at different times as represented by users 215. When the primary data is changed, a change pointer is created and distributed as indicated at 220, to a time management component 225. In one embodiment, a change pointer references or identifies the data that changed, and provides an effective date of the change. The effective date may be the result of business rules that are applied to the change.

In one embodiment, the change pointers are distributed only when corresponding data is read, as indicated at 230. The change pointers may be stored with the primary data in one embodiment, or may be otherwise stored in a manner that they can be provided to the time management system 225 when corresponding data is read or otherwise.

In one embodiment, the change pointers are sent asynchronously to the time management component. In one example, while evaluation of data is being performed by the time management component, an organizational change may be performed in MOM primary data. Consecutive read access to personal administration data and/or MOM primary data may result in the delivery of wrong, or even contradictory data during the running of the evaluation. Therefore, time evaluation may produce a wrong result, or may stop in the face of the contradiction with an error condition indicated, or may just not provide any results. At some later time, one or more change pointers generated in response to the change in data are provided to the time management component. A reevaluation may be performed with correct results.

Figure 3:
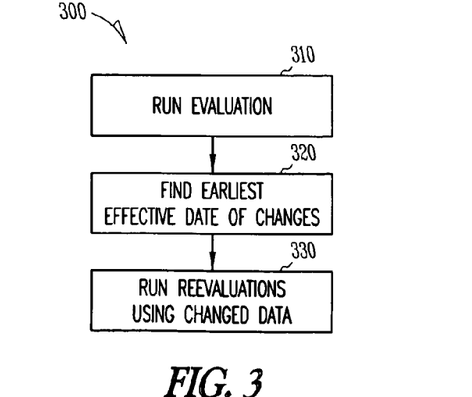
FIG. 3 is a flow chart illustrating running of re-evaluations according to an example embodiment.

FIG. 3 is an example block diagram of a method 300 for recalculating data. At 310, a process is started to evaluate selected data. One example would be a periodic payroll evaluation performed by a time management component of a distributed component based transaction system. An earliest effective date of changed selected data is found at 320. This may be done by determining which change pointers apply to the selected data, and then reviewing the change pointers to determine the earliest effective change date for changed data. At 330, data generated by prior run processes occurring after the earliest effective data is recalculated or reevaluated to determine what the correct results should have been. In a payroll evaluation, it may result in back pay being determined and a check or electronic deposit being done. Further, payroll taxes and other results that may have changed due to the change in data may cause further transactions to correct the amount of taxes withheld. The payroll evaluation is just one example. Many other components implementing different functions may also benefit from the use of change pointers and the ability to reevaluate data that may have changed. The evaluations need not be periodic, but may also be run ad-hoc. By keeping track of them, it is possible to re-run them if needed.

Figure 4:
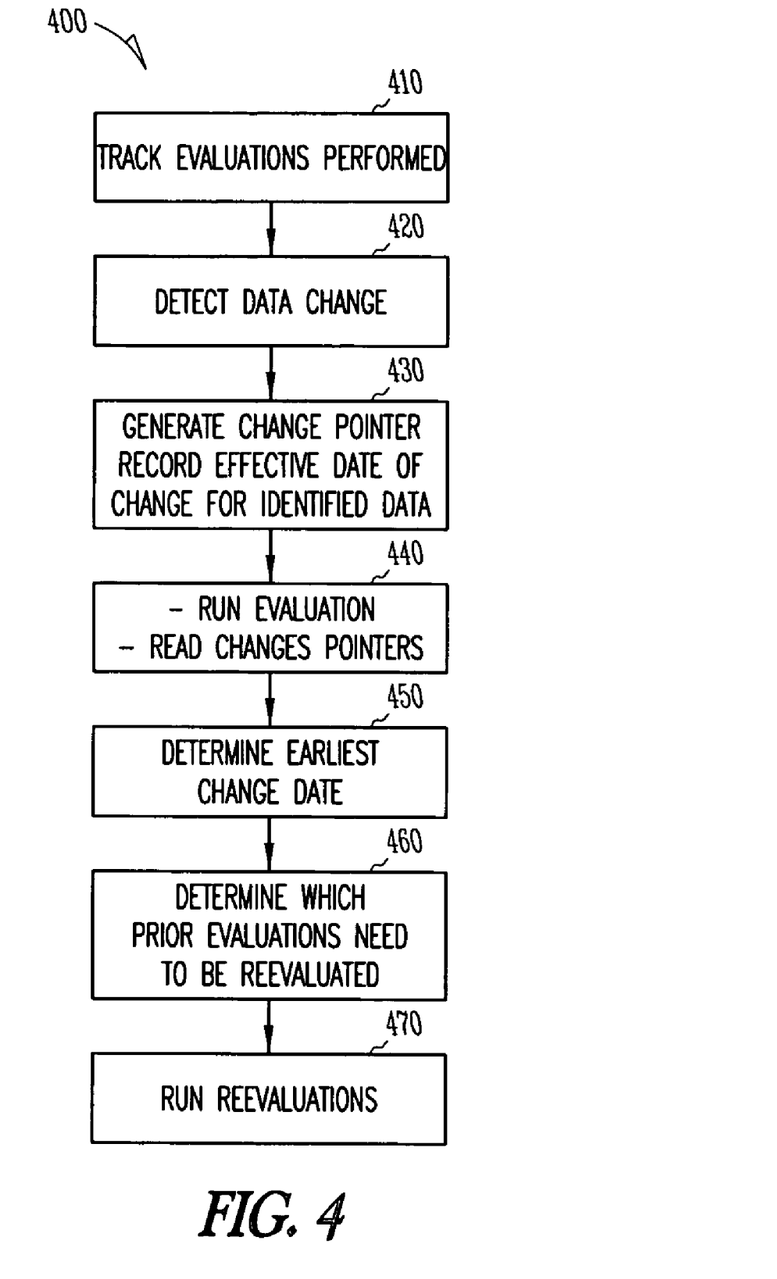
FIG. 4 is a flow chart illustrating creation and use of change pointers according to an example embodiment.

In one embodiment, as illustrated in the flowchart of FIG. 4 at 400, the time management component keeps track of evaluations performed at 410, including the date of the evaluations. Data changes are detected in the primary data at 420, and change pointers are generated at 430 identifying an effective data of change for identified data. At 440, an evaluation may be run, and the change pointers are read. When performing reevaluations in light of received change pointers, the pointers are reviewed, and the earliest effective date of all relevant data changes is determined at 450. The time management component then determines which evaluations may be affected by the data changes at 460. In one embodiment, all evaluations occurring after the earliest effective date are reevaluated at 470, resulting in a correct result. It should be noted, that further changes may occur, after, or during the reevaluations, resulting in a further round of reevaluation.

In one embodiment, the evaluations are periodic, such as weekly, bi-monthly, or monthly payroll calculations. In such events, a pay change made in March, may result in retroactive changes in pay back three months to January. In such a case, the next evaluation of payroll results in the discovery of relevant change pointers. The change pointers point back to an effective date of January, and all payroll runs since January are reevaluated, resulting in back pay, and new tax withholding to name a few of the many possible consequences of such a retroactive change.

Upon successful completion of reevaluations, the change pointers that were considered, are marked as evaluated, and may be deleted as desired. If an error occurred, or if more changes are detected during a reevaluation, the change pointers may not be marked as evaluated, and the process of determining an earliest effective date reflected in the change pointers is repeated until correct reevaluations are completed. At that time, all change pointers involved in the reevaluation are marked as evaluated and may be deleted immediately or when desired.

The above process of reevaluation of evaluations may be repeated if changes in data occur during the reevaluation. A read request during a reevaluation may relate to data that is changed, but uncommitted by another transaction. Such data may not be committed, but rather rolled back. It is desirable to read only data that has been committed to make sure it is correct. While the risk of such data changing during the reevaluations may be small, locking of data may diminish such risk. However, if significant amounts of data are locked, components running different evaluations or processes may be prevented from running. Such components may not even result in transactions that need to access the same data as being used during reevaluations. This may cause significant overall performance delays.

One evaluation locking approach utilizes a combined coarse and fine grain exclusive lock. The coarse lock is used to lock other similar component evaluations from running until a current evaluation process completes. The fine lock is used to lock selected records in the primary data, such as the data for an employee. A lock argument is defined as a concatenation of coarse_id (f.i. employee) and fine_id (f.i. primary data record id). Primary data recording requests a shared lock during update with argument coarse_id/fine_id. An evaluation may request an exclusive lock during a complete run with coarse_id in the lock argument and wildcards for the fine_id. This approach offers a consistent read of primary data and avoids access to uncommitted primary data inside the time management component. Retroactivity of changes to data may be handled via the change pointers described above. A fine-grain (optimistic) locking is provided for primary data independent of evaluation locking.

In one embodiment, all employees have an id, referred to as EID. The date of employees consists of single data records, each having an id, DID. An evaluation lock may be set for the argument EID-DID, and a data recording lock may be set for the argument DID. The locks may be used in different manners for data recording processes by users, and for evaluation processes.

Figure 5A:
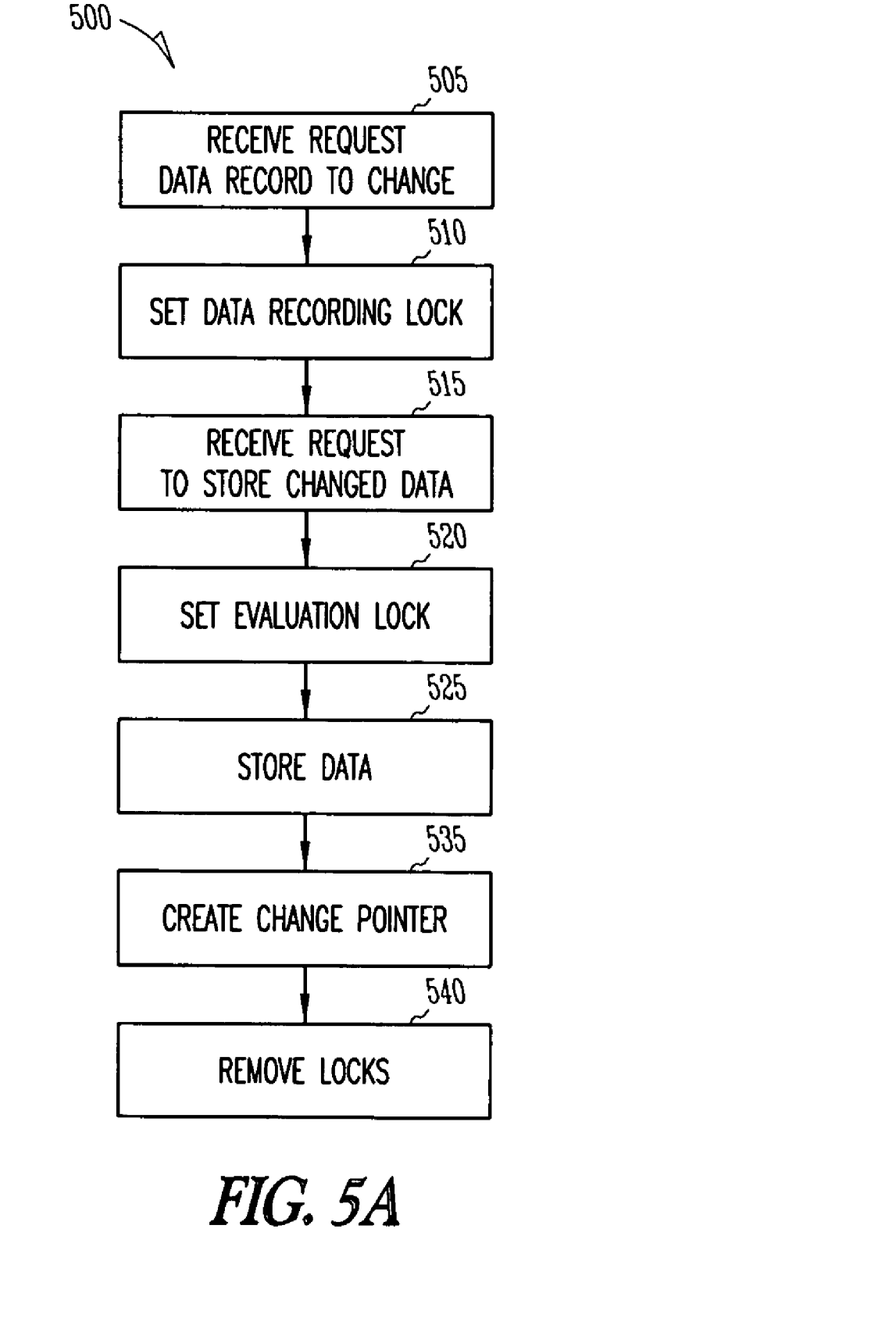
FIG. 5A is a flow chart illustrating use of dual locking mechanisms according to an example embodiment.

In a data recording process illustrated in FIG. 5A at 500, a user may select an employee and request to change a data record with a DID at 505. A fine data recording lock is set for the DID at 510. If the lock cannot be set due to another user changing that data record, the user is informed and waits until the other user saves their changes. A simultaneously running evaluation does not prevent the user from obtaining the lock. The user may then change data and request to save the changed data at 515. A coarse evaluation lock is set for EID-DID at 520. If the lock cannot be set due to a running evaluation, the user is informed, can wait a few seconds and request the save again. In normal system operation, data evaluations may be performed very quickly (sub-second duration), therefore the waiting period means no serious disruption to the user.

The data is then stored into the database at 525, a change pointer for EID, DID may be created and stored at 535, the evaluation lock for EID-DID is removed, and the data recording lock for DID is removed at 540.

Figure 5B:
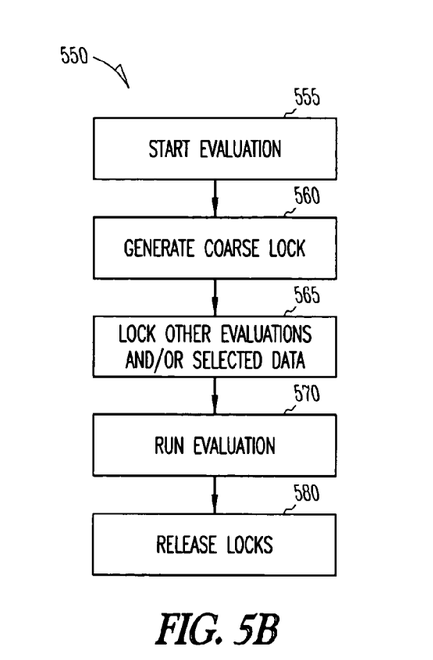
FIG. 5B is a flow chart illustrating use of a coarse lock for an evaluation according to an example embodiment.

For evaluations, an evaluation process at 550 in FIG. 5B, for an employee EID, may be initiated at 555. A coarse evaluation lock is generated for EID-* at 560 and set at 565. The "*" is a wildcard that matches all possible DID. If the lock cannot be set due to other running evaluations for the EID or due to users saving data, the evaluation of this EID is postponed. The data is evaluated at 570, including possible re-evaluations, and the evaluation results are stored. The evaluation lock for EID-* is then removed at 580.

A further evaluation locking approach utilizes a coarse-grain shared/exclusive lock, and is also illustrated in FIGS. 5A and 5B. The lock argument is coarse_id (f.i. employee). Primary data recording requests a shared lock during update with argument coarse_id. Evaluation requests an exclusive lock during a complete run with the lock argument coarse_id. This approach offers a consistent read of the primary data and avoids access to uncommitted primary data inside the time management component. Retroactivity may be handled via the above change pointers. The approach also provides fine-grain (optimistic) locking for primary data independent of evaluation locking.

An evaluation lock may be set for the argument EID, and a data recording lock may be set for the argument DID. The locks may be used in different manners for data recording processes by users, and for evaluation processes.

In a data recording process 500, a user may select an employee and request to change a data record with a DID at 505. An exclusive fine data recording lock is set for the DID at 510. If the lock cannot be set due to another user changing that data record, the user is informed and waits until the other user saves their changes. A simultaneously running evaluation does not prevent the user from obtaining the lock. The user may then change data and request to save the changed data at 515. A shared coarse evaluation lock is set for EID at 520. If the lock cannot be set due to a running evaluation, the user is informed, can wait a few seconds and request the save again. In normal system operation, data evaluations may be performed very quickly (sub-second duration), therefore the waiting period means no serious disruption to the user. Other users may simultaneously change and update other data records (a shared lock allows other shared locks with the same argument.)

The data is then stored into the database at 525, a change pointer for EID, DID is created and stored at 535, the shared evaluation lock for EID is removed, and the exclusive fine data recording lock for DID is removed at 540.

For evaluations, an evaluation process 550 for employee EID may be initiated at 555. An exclusive coarse evaluation lock is generated at 56 and set for EID at 565. If the lock cannot be set due to other running evaluations for the EID or due to users saving data, the evaluation of this EID is postponed. Exclusive locks do not allow other locks with the same argument. The data is evaluated at 570, including possible re-evaluations, and the evaluation results are stored. The evaluation lock for EID is then removed at 580.

Figure 6:
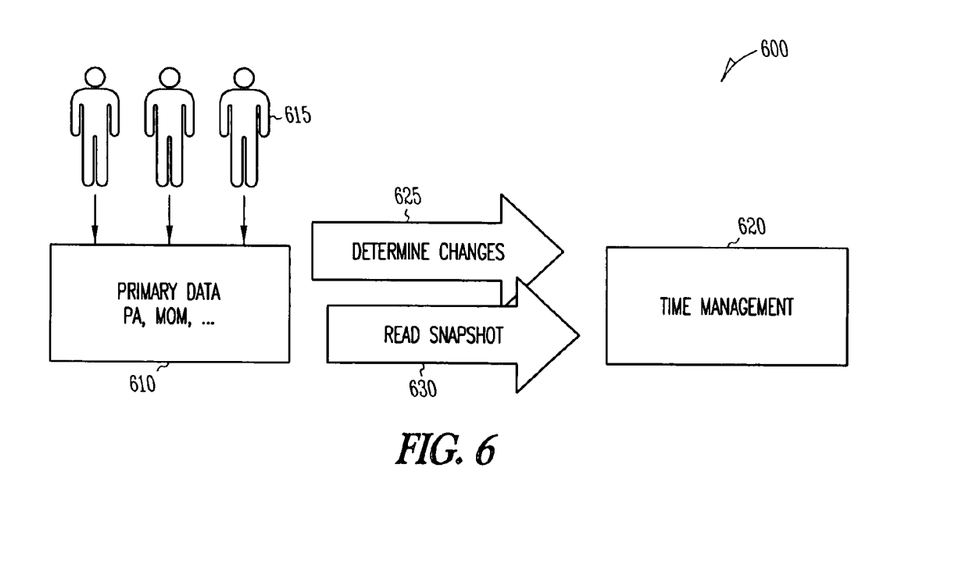
FIG. 6 is a block flow diagram illustrating the use of snapshots of changing data to avoid the use of locks according to an example embodiment.

In a further embodiment, data read inconsistencies may be minimized when data is changing as illustrated in block diagram form generally at 600 in FIG. 6. Primary data is represented in block 610, and may be changed by users at different times as represented by users 615. When the primary data is changed, the exact time of change is recorded with the primary data, or with a change pointer. The effective date of change may also be recorded. A copy of the data prior to the change, or snapshot is prepared. In one embodiment, above generated data is stored in the database. A database may provide support for keeping snapshots of previous data in further embodiments.

When a time management component 620 requests data and it is determined that the data has changed recently, the snapshot 625 of the prior data may be used for a current evaluation. A security period, such as five minutes is used to define what constitutes a recent change. In one embodiment, the security period is a function of how long it takes from when data is changed in the primary data to when the change is committed. It may for example, be about five minutes in one embodiment. Other security periods may be used as desired.

For all primary data changes, an exact timestamp is available and recorded. All data changed in a certain time interval is determined. The primary data is then read at a certain point in time, using the snapshot or a history of the data changes in the primary data depending on which is prior to the security period. The security period compensates for database commit delays, and solves some potential access problems, such as consistency of primary data, and uncommitted primary data. The use of a snapshot in the above manner is complimentary to the use of change pointers, and may be used in place of locks.

Figure 7:
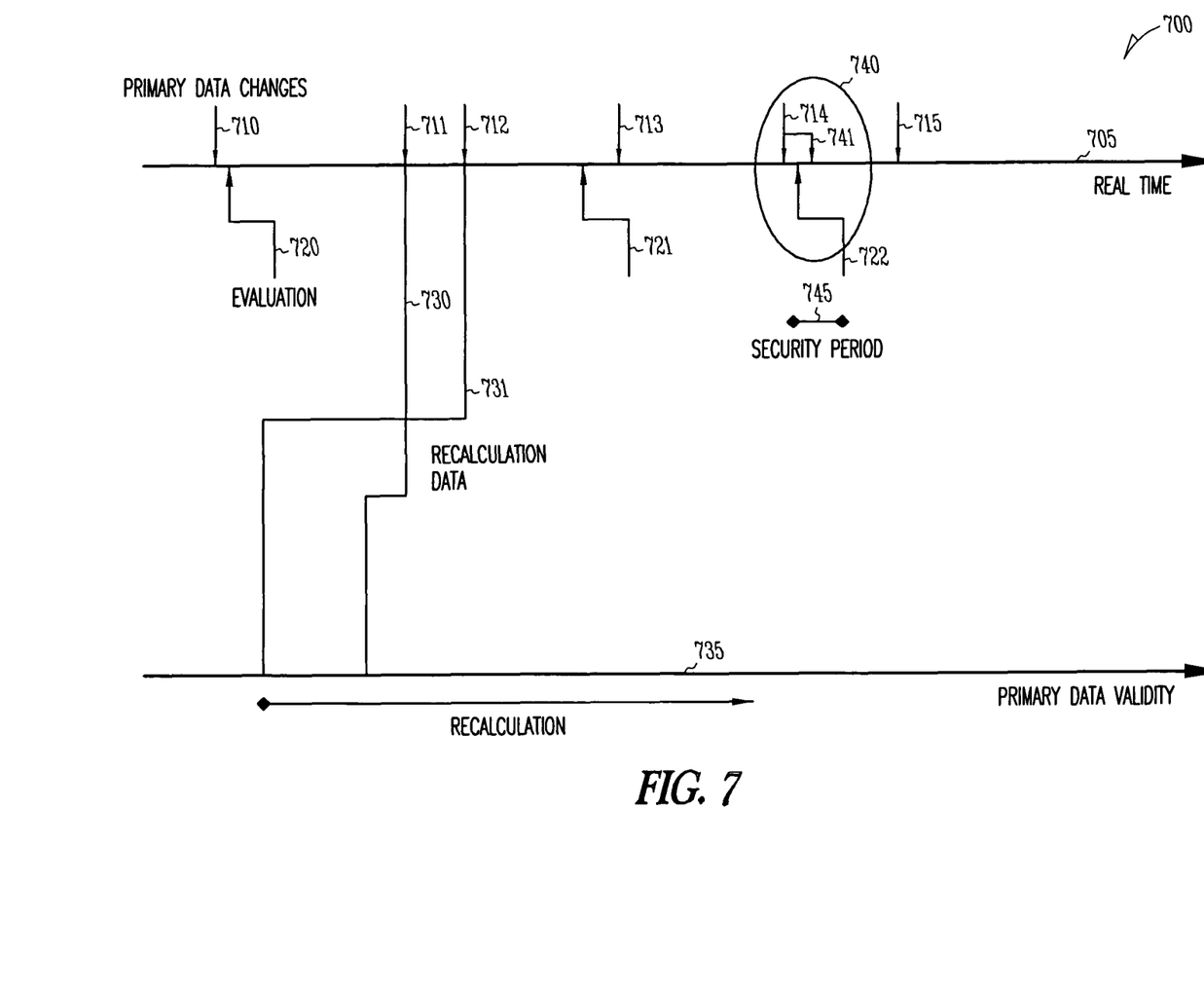
FIG. 7 is a time line diagram illustrating use of snapshots for changes to primary data according to an example embodiment.

FIG. 7 is a timeline representation illustrating evaluations in conjunction with primary data changes generally at 700. A time line 705 is used to represent real time. Changes to the primary data are represented by arrows at 710, 711, 712, 713, 714 and 715. Evaluations are represented by darker lines at 720, 721 and 722. Effective dates of change of the data changes are shown by lines 730 and 731, which point to a primary data validity line 735, indicating effective dates for the data changes.

The first data change at 710 does not result in any earlier effective dates for data, and does not affect the evaluation 720, performed after the change. Two further changes occur at 711 and 712, resulting in retroactive changes to the data as illustrated at 730 and 731. The effective date corresponding to 731 appears to occur during the execution of the evaluation 720, and may result in a recalculation of evaluation 720. Data change 713 also appears to occur during evaluation 721 and may result in an error, or a recalculation.

Circle 740 illustrates a change in data at 714 that occurs just prior to the beginning of evaluation 722. In this case however, the change has not been committed at 741 prior to the start of the evaluation. It is not known whether the change will be committed, so the evaluation should not rely on the new data. In this case, a snapshot of the prior data is used, as the evaluation utilized a security period 745 to determine that the snapshot was the appropriate data to use. In one embodiment, as illustrated, the security period 745 is slightly longer than the time to commit the change between 714 and 741. This ensures that uncommitted data is unlikely to be used for evaluations.

Figure 8:
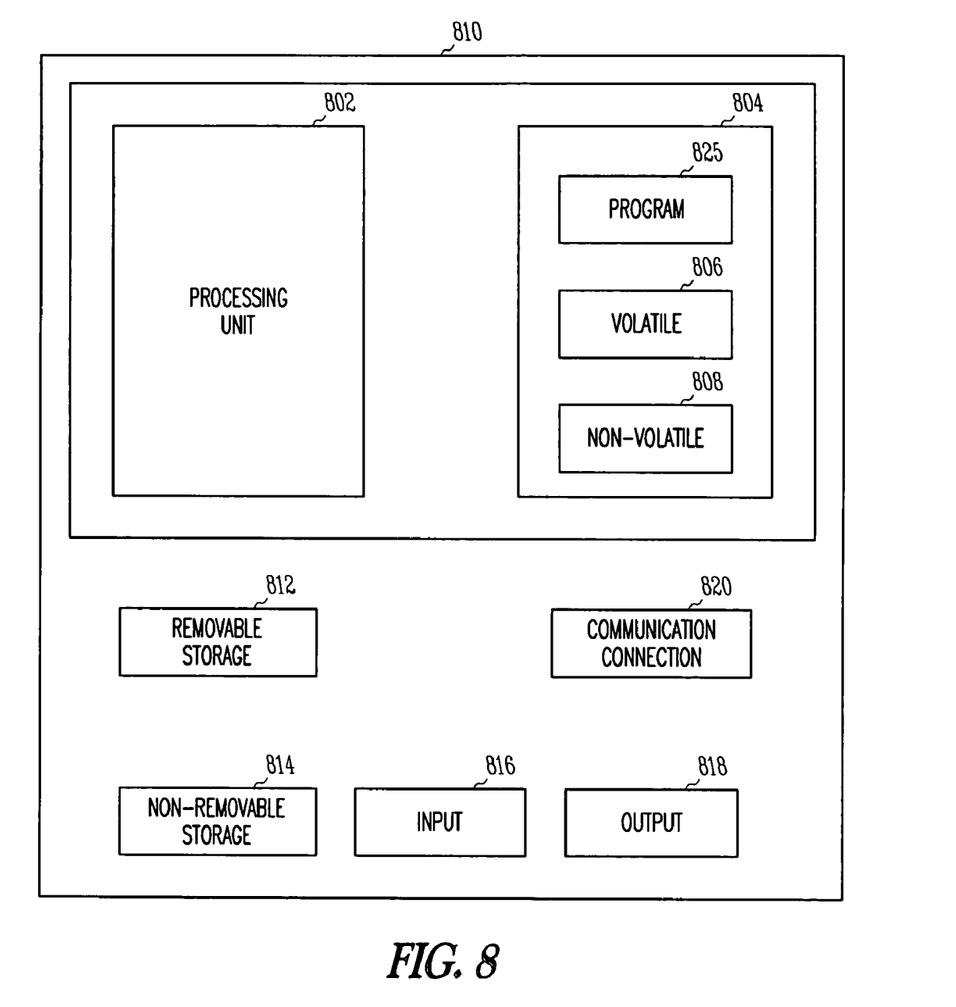
FIG. 8 is a block diagram of a typical computer that runs components in distributed transaction based system according to an example embodiment.

A block diagram of a computer system that executes programming for performing the above functions is shown in FIG. 8. In one embodiment, multiple such computer systems are utilized in a distributed network to implement multiple components in a transaction based environment. An object oriented architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include—or have access to a computing environment that includes—a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a computer-readable medium. The term "computer readable medium" is also used to represent carrier waves on which the software is transmitted. For example, a computer program 825 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 810 to provide generic access controls in a COM based computer network system having multiple users and servers.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A system comprising:
   an evaluation module that evaluates data including reading selected data; and
   a locking module that creates different granularity locks including a coarse exclusive lock as a function of a coarse ID to ensure only one evaluation is run on coarsely selected data until completed and a fine exclusive lock as a function of a concatenation of the coarse ID with a fine ID on a selected data record to prevent modification of the record;
   wherein the locking module applies the fine lock while a user changes a record, applies the fine lock and the coarse lock while such a changed record is being stored, and applies the coarse lock during reading the selected data to other evaluations.

2. A system comprising:
   a module stored on a storage device to provide a coarse evaluation lock having a coarse ID during reading of data to ensure only one evaluation that includes reading of selected data is run on the selected data until completed; and
   a module stored on a storage device to provide a fine exclusive lock as a function of a concatenation of the coarse ID with a fine ID on selected data to ensure only one user may change such selected data.

3. A system comprising:
   a module stored on a storage device to receive a user request to modify a selected data record;
   a module stored on a storage device to set a fine data recording lock having a coarse ID concatenated with a fine ID to ensure only one user may change such selected data record;
   a module stored on a storage device to receive a request to save changed data;
   a module stored on a storage device to set a first coarse evaluation lock having a coarse ID corresponding to the changed data;
   a module stored on a storage device to set a second coarse evaluation lock during a read of selected data during an evaluation; and
   a data storage device to store the changed data.

4. The system of claim 1 wherein the modules are in a component of a distributed multi-user transaction based system.

5. The system of claim 1 wherein the locking module releases the locks upon completion of an evaluation or storing of records.

6. The system of claim 1 wherein the coarse exclusive lock functions to prevent other evaluations from running at the same time as the evaluation module performs an evaluation.

7. The system of claim 2 wherein the coarse exclusive lock corresponds to an employee.

8. The system of claim 2 wherein the locks are applied during an evaluation.

9. The system of claim 7 wherein the fine exclusive lock corresponds to a primary data record of the employee.

10. The system of claim 9 wherein a lock argument which is a concatenation of an employee id and a wildcard for primary data records of the employee is created.

11. The system of claim 3 and further comprising:
    a module stored on a storage device to start an evaluation process for selected data;
    a module stored on a storage device to set a second coarse evaluation lock for the selected data;
    a module stored on a storage device to evaluate the selected data; and a module stored on a storage device to remove the second coarse evaluation lock.

12. The system of claim 11 wherein the fine data recording lock comprises an exclusive data recording lock.

13. The system of claim 3 wherein the fine data recording lock is an exclusive lock.

14. The system of claim 3 wherein the fine data recording lock and the first coarse evaluation lock are released once the data is stored.

15. The system of claim 9 wherein a lock argument which is a concatenation of an employee id and a primary data record of the corresponding employee is created.

16. The system of claim 8 wherein the locks are released upon completion of the evaluation.

17. The system of claim 3 wherein the coarse evaluation lock corresponds to plural records of an employee.

18. The system of claim 17 wherein the fine data recording lock corresponds to a single record of an employee.

19. The system of claim 10 wherein the lock argument indicates a specific primary data record as an evaluation is evaluating specific data in the primary data record.

20. The system of claim 19 wherein modification of the lock argument is repeated for each primary data record as it is being accessed by the evaluation.

* * * * *